Patented Dec. 5, 1950

2,533,100

UNITED STATES PATENT OFFICE 2,533,100

NYLON IMMUNIZED AGAINST DYES BY SULFURIZED PHENOLS

Walter Flügel, Hans Martin Hemmi, Kurt Hofer, and Adam Mikula, Basel, Switzerland, assignors to Sandoz Limited, Basel, Switzerland No Drawing. Application April 15, 1948, Serial No. 21,308. In Switzerland April 16, 1947

4 Claims. (Cl. 8—115.5)

The main object of the present invention is directed to synthetic linear polyamides and a process for their preparation. The new process of the present invention consists in treating colourless or coloured synthetic linear polyamides at an elevated temperature with non-dyeing thioderivatives of phenols or with reduction products of these compounds. This treatment is carried out in an aqueous solution, preferably in an alkaline medium and a temperature of 60–100° C.

The synthetic linear polyamides which can be subjected to the process of the present invention can be of different origin. For instance one can use the products known under the trade names of "nylon" and "Perlon" which can be obtained by the action of diamines on dicarboxylic acids, or by condensation of aminocarboxylic acids with one another or by polymerisation of the corresponding lactams. Also products obtainable by the action of diisocyanates on glycols or diamines, or all other products of synthetic linear polyamide nature which can be employed for the preparation of artificial fibres or threads can be used for carrying out the new process.

The colourless thioderivatives of phenols which are preferably used for carrying out the present invention can be prepared for instance according to the processes described in U. S. Patents 1,450,463; 1,928,257; 1,931,197; 1,943,179; 1,989,989.

The thioderivatives of phenols prepared according to the processes described in the above cited patents or according to other well-known processes contain generally, as free acids, 26–40% of combined sulfur. The thioderivatives containing complex linked metals contain generally less sulfur, e. g. the tin complex derivative of thiophenol contains as free acid 17.3% of tin and 29.5% of sulfur, whereas the respective antimony complex compound contains 17.5% of antimony and about 17% of sulfur. These thioderivatives of phenols can be employed on the synthetic linear polyamides in form of their salts or in form of metal complexes or after having been subjected to a treatment with reducing agents like sodium sulfide, sodium hydrosulfite, glucose and the like. This treatment is carried out preferably in the presence of substances possessing an alkaline reaction. This treatment with thioderivatives of phenols can be carried out in a very short time, for instance in 15 to 30 minutes in aqueous alkaline solutions of the said thioderivatives at the boiling temperature, if desired in presence of water-soluble salts, like the chlorides, phosphates, metaphosphates or sulfates of alkaline metals. This treatment can also be carried out by means of a printing paste containing an alkaline agent, the said thio-derivatives and, if desired, suitable dyestuffs. In the case the synthetic linear polyamides are treated with a printing paste of the above said composition, the treated material is dried, steamed and washed. Such printing pastes may be considered as thickened solutions of the thioderivatives. The treating of the above cited polyamides with solutions of the thioderivatives includes therefore the treatment with the said printing pastes.

One object of the present invention is the treatment of fibres, threads, fabrics or other associations of fibres, of leaves and films or other materials which can be subjected to a dyeing process, especially textile materials, which consist of synthetic linear polyamides, with non-dyeing thioderivatives of phenols or their products of reduction.

Another object of the present invention is the treatment of the said synthetic linear polyamides at an elevated temperature with aqueous alkaline solutions of a non-dyeing thioderivative of phenols or their products of reduction.

Still another object of the present invention is the treatment of the synthetic linear polyamides with printing pastes containing an alkaline agent, a non-dyeing thioderivative of phenols or a reduction product thereof and, if desired, a suitable dyestuff.

The synthetic linear polyamides treated according to the present invention show modified properties insofar as they no longer possess any affinity for substantive, acid, sulfur, chrome and vat dyestuffs, that is to say when they are immersed in a bath containing dyestuffs of the above cited classes, they remain white, or if they have been coloured before the treatment, they retain the original shade. If these polyamides have been modified in their properties by the so-called printing process, the parts treated remain also reserved against the above cited dyestuffs.

Further it has been observed that the dyeings of synthetic linear polyamides which have been produced by a dyeing or printing operation before the treatment according to the present invention show, after the treatment with the above cited thioderivatives, increased fastness properties, especially to water, acids, washing, perspiration and cross-dyeing without causing a decrease of the fastness to light.

The application of the present invention in dyeing and printing makes it possible, therefore, to realize various dyeing and printing effects. For instance it is possible to treat, with the above cited thioderivatives, mixed fabrics composed, on the one hand, from fibres consisting of synthetic linear polyamides and, on the other hand, from natural or artificial fibres other than synthetic linear polyamides and to dye them with the dyestuffs of the above cited classes, whereby the treated synthetic linear polyamides will remain unchanged in their shade, whereas the other fibres will be dyed.

Therefore, another object of the present invention is the dyeing of mixed fabrics containing synthetic linear polyamides which have been subjected to the treatment of the present invention.

The following examples, without being limitative, show how the present invention can be carried out, the parts being by weight.

Example 1

10 parts of a thioderivative of phenol, which is obtained for example by heating, during 30 hours at about 103° C., 180 parts of phenol with 200 parts of water, 80 parts of sodium hydroxide and 170 parts of sulfur and which contains as free acid about 39% of combined sulfur, are dissolved together with 4 parts of sodium carbonate and 2 parts of hydrosulfite in 1000 parts of water and heated during 5-10 minutes to the boil. Into this solution are then immersed 100 parts of a yarn consisting of synthetic linear polyamides and treated therein for 50 minutes at the boil. The yarn thus treated can no more be dyed with acid, substantive, vat or sulfur dyestuffs.

Example 2

10 parts of the thioderivative used in Example 1 are dissolved with 5 parts of sodium sulfide and 10 parts of sodium metaphosphate in 1000 parts of water and the solution heated to the boil. Into this solution are then introduced 100 parts of a yarn consisting of linear polyamides of the type of "nylon," that has been previously dyed with Azorubinol 3GS or Alizarine light blue 4GL and heated during 15 to 20 minutes at 80–100° C. After drying, a yarn will be obtained that is fast to cross-dyeing. The fastness properties of the dyeing are substantially improved by this treatment.

Example 3

10 parts of the tin-containing thioderivative prepared according to Example 2 of U. S. Patent No. 1,928,257 containing as free acid about 17.3% of tin and 29.5% of sulfur are dissolved together with 2 parts of hydrosulfite and 4 parts of sodium carbonate in 1000 parts of water and heated to the boil. By treating white or dyed yarn consisting of polyamides or polyurethanes with this solution at the boil for 10 to 30 minutes, the yarns obtained can no longer be dyed with acid dyestuffs.

Instead of the tin-containing product used in this example, other metallized thio-derivatives of phenol can be used.

Example 4

10 parts of the thioderivative prepared according to Example 1 of U. S. Patent No. 1,450,463 containing as free acid about 39% of combined sulfur are dissolved together with 1 part of sodium hydroxide and 10 parts of glucose in 1000 parts of water and heated to the boil. By treating for instance "nylon" yarn with this solution at the boil for 10 to 30 minutes, the said yarn will become fast to cross-dyeing with sulfur and vat dyestuffs.

Example 5

10 parts of the thioderivative of phenol used in Example 1 are dissolved together with 6 parts of sodium carbonate in 1000 parts of water. This solution is heated to the boil and a superpolyamide yarn consisting of a condensation product of hexamethylene-diamine and adipic acid is treated therein at the boil for 10–30 minutes. The yarn is then rinsed and dried. The modified yarn thus obtained can no longer be dyed with substantive, acid, sulfur, chrome and vat dyestuffs.

Example 6

A superpolyamide yarn as used in Example 5 is first dyed with 2% of Azorhodin 2G (Schultz Farbstofftabellen No. 40, edition 1931). 10 parts of the thioderivative of phenol obtained in the manner described in Example 1 are dissolved together with 6 parts of sodium carbonate and 10 parts of sodium metaphosphate in 1000 parts of water and the dyed yarn is treated therein at the boil for 15 to 30 minutes, rinsed and dried. A yarn will thus be obtained which is fast to cross-dyeing and the fastness properties of which have been largely improved in respect to wet treatments.

Example 7

A superpolyamide fibre consisting of polymerised ε-caprolactam is dyed with 2% of Congo Corinth G (Colour Index No. 365). This fibre is then treated in a bath containing 10 parts per liter of the thioderivative of phenol obtained, as described in Example 1, and 6 parts per liter of sodium carbonate for 15 minutes at 90° C. The yarn treated in this manner possesses improved wet fastnesses, especially in respect to alkaline treatments.

Example 8

The superpolyamide fibre used in Example 5 is dyed in the usual manner with 2% of Alizarine Chrome Yellow (Schultz Farbstofftabellen Number 230) and treated in the same manner as in Example 7. Its fastness properties towards wet treatments become substantially improved.

Example 9

The superpolyamide fibre used in Example 7 is dyed in the usual manner with 2% of Thional Brilliant Green 3G and treated with the thioderivative of phenol obtainable in the manner described in Example 1, the treatment being carried out in the same manner as described in Example 7. The modified fibre thus obtained shows an improved fastness to alkaline washing.

Example 10

The superpolyamide fibre used in Example 5 is dyed in the usual manner with 2% of Tetrabrom Indigo 2G (Colour Index No. 1184). This dyed yarn is then treated in the manner described in Example 7. The fastness of the dyeing thus obtained to alkaline washing and its cross-dyeing fastness are greatly improved.

Example 11

10 parts of the tin-containing thioderivative of phenol used in Example 3 are dissolved together with 6 parts of sodium carbonate in 1000 parts of water and heated to the boil. A superpolyamide fibre previously dyed with 2% of Azorhodin 2G (Schultz Farbstofftabellen No. 40, edition 1931) is immersed in the said bath at the boiling temperature and treated for 20 minutes in the manner described in Example 5, whereupon it is rinsed and dried Thus coloured fibres will be obtained which are fast to cross-dyeing with substantive, acid, sulfur, chrome and vat dyestuffs.

*Example 12*

10 parts of the thioderivative used in Example 4 are dissolved together with 6 parts of sodium carbonate and 10 parts of sodium metaphosphate in 1000 parts of water and heated to the boil. Into this solution are then introduced 80 parts of a superpolyamide yarn as used in Example 5 and treated for 30 minutes, rinsed and dried. The yarn thus obtained can no more be dyed with direct, acid, sulfur, chrome and vat dyestuffs.

*Example 13*

A mixed fabric consisting of wool and polyamide fibres of the nature described in Example 5 is treated at the boil for 20 minutes with a solution of a thioderivative of phenol prepared as described in Example 1 and this in the following manner:

2 parts of the said thioderivative are dissolved together with 1.2 parts of sodium carbonate; thereupon 2 parts of sodium stearate and 2 parts of technical formaldehyde bisulfite compound are added to the bath which is filled up to 1000 parts. To the clear solution thus obtained are added 30 parts of sodium chloride and the yarn immersed therein at the boil for 20 minutes, rinsed and dried. The fabric thus obtained shows practically unaltered dyeing properties of the wool, whereas the polyamide fibres, when the piece is dyed by the usual chrome dyeing process with for instance Alizarine Chrome Yellow (Schultz Farbstofftabellen No. 230, edition 1931) remain completely reserved.

*Example 14*

A printing paste consisting of 500 parts of tragacanth thickening 60:1000, 440 parts of water and 30 parts of the thioderivative of phenol prepared as described in Example 1 is printed on a fabric consisting of superpolyamide fibres of the nature described in Example 5. The fabric is then dried, steamed in the usual manner during 10 minutes and rinsed with warm water. By dyeing the fabric thus treated with Xylene Fast Blue AE (Schultz Farbstofftabellen No. 974) the printed places remain colourless.

*Example 15*

A printing paste consisting of 10 parts of Xylene Fast Blue AE (Schultz Farbstofftabellen No. 974, edition 1931), 50 parts of urea, 140 parts of water, 400 parts of tragacanth thickening 60:1000 and 20 parts of aluminium sulfate is mixed with a solution of 30 parts of the thioderivative used in Example 1, dissolved in 350 parts of water and the pH of this paste is adjusted 9–10 by means of sodium carbonate. This printing paste is then applied on a fabric of the kind of that mentioned in Example 14, dried, steamed for 30 minutes and rinsed at 70–80° C. The blue printed fabric thus obtained is then dyed in the usual manner with Azorhodin 2G (Schultz Farbstofftabellen No. 40, edition 1931), whereby the printed places remain undyed.

What we claim is:

1. A process for modifying the tinctorial properties of textile material manufactured from synthetic linear polyamides, which comprises the step of treating such material for about 10 to 30 minutes at 90 to 100° C. with an aqueous alkaline solution of a water-soluble member of the group consisting of sulfurized phenols containing from 26 to 40% of sulfur attached to the molecule and the metal salts, metal complexes and reduction products thereof.

2. A process for modifying the tinctorial properties of textile material manufactured from synthetic linear polyamides, which comprises the step of treating such material with an alkaline printing paste containing as an essential ingredient a water-soluble member of the group consisting of sulfurized phenols containing from 26 to 40% of sulfur attached to the molecule and the metal salts, metal complexes and reduction products thereof, and subsequently drying and steaming the resultant printed material for about 10 to 30 minutes.

3. Textile material manufactured from synthetic linear polyamides, the tinctorial properties of which have been modified by a treatment for about 10 to 30 minutes at 90 to 100° C. with an aqueous alkaline solution of a water-soluble member of the group consisting of sulfurized phenols containing from 26 to 40% of sulfur attached to the molecule and the metal salts, metal complexes and reduction products thereof.

4. Textile material manufactured from synthetic linear polyamides, the tinctorial properties of which have been modified by a treatment with an alkaline printing paste containing as an essential ingredient a water-soluble member of the group consisting of sulfurized phenols containing from 26 to 40% of sulfur attached to the molecule and the metal salts, metal complexes and reduction products thereof, followed by drying and steaming for about 10 to 30 minutes.

WALTER FLÜGEL.
HANS MARTIN HEMMI.
KURT HOFER.
ADAM MIKULA.

REFERENCES CITED

The following references are of record in the file of this patent:

UNITED STATES PATENTS

| Number | Name | Date |
|---|---|---|
| 2,214,405 | Coffman | Sept. 10, 1940 |
| 2,265,119 | Coolidge | Dec. 2, 1941 |
| 2,316,949 | Garvey | Apr. 20, 1943 |
| 2,346,826 | Cook et al. | Apr. 18, 1944 |

FOREIGN PATENTS

| Number | Country | Date |
|---|---|---|
| 552,015 | Great Britain | Mar. 19, 1943 |